United States Patent [19]

Mobley

[11] 4,011,783
[45] Mar. 15, 1977

[54] CIRCULAR SAW
[75] Inventor: Leonard James Mobley, Tallmadge, Ohio
[73] Assignee: Lear-Sigler, Inc., Santa Monica, Calif.
[22] Filed: Jan. 22, 1976
[21] Appl. No.: 651,572
[52] U.S. Cl. .................................... 83/846; 83/851
[51] Int. Cl.² .................. B23D 45/00; B27B 33/08
[58] Field of Search .................... 83/851, 846, 835

[56] References Cited
UNITED STATES PATENTS 3,878,747   4/1975   Soderstrom ...................... 83/835
3,924,318   12/1975   Baker ............................ 83/851 X Primary Examiner—Willie G. Abercrombie

[57] ABSTRACT

A circular saw is made with carbide-tipped teeth arranged in pairs to effect a so-called "triple-chip" cutting operation for thermoplastic materials. Both teeth of each operational pair have two negatively-raked cutting edges which slope toward each other at the outer extremity of the teeth to a transverse radially outermost cutting edge. The so-called "high" tooth of each pair has its transverse cutting edge radially offset a greater distance from the rotational axis of the saw than the corresponding transverse edge of each low tooth. The lateral negatively-raked cutting edges of each low tooth are laterally separated a greater distance than the corresponding sloping cutting edges of the high tooth. Saws of this character are specially useful for cutting plastic materials and particularly materials such as acrylics and vinyls.

1 Claim, 6 Drawing Figures

CIRCULAR SAW

This invention relates to circular saws particularly designed to make a smooth finished surface out through plastic materials. These saws are especially useful for sawing thermoplastic materials such as acrylics or vinyls.

According to the present invention, a circular saw is provided with pairs of peripheral teeth arranged to provide a so-called "triple-chip" cutting action in thermoplastic materials. The "high" tooth of each pair has a radially outer transverse cutting edge which is parallel to the rotational axis of the saw and which is flanked at each end by negatively-raked lateral cutting surfaces which slope toward each other to their junction with the radially outer cutting edge. These high teeth initially engage a work piece at two laterally separated points on the sloping negatively-raked cutting edges. And as the tooth proceeds into the work piece, the chips thus formed are progressively lengthened by a chiseling or peeling action until they are eventually severed from the work piece by the outer transverse cutting edge.

The "low" tooth of each pair has corresponding cutting edges except that the lateral sloping negatively-raked cutting edges are separated a significantly greater amount than the separation between the sloping edges of each high tooth. Each low tooth, accordingly, initially engages the work material by a point contact on the sloping edges and then, progressively, the remaining portions of the sloping edges come into engagement with the work to sever chips along the sides of the kerf.

The accompanying drawings show one example of a carbide-tipped circular saw made according to and embodying this invention.

Figure 1:
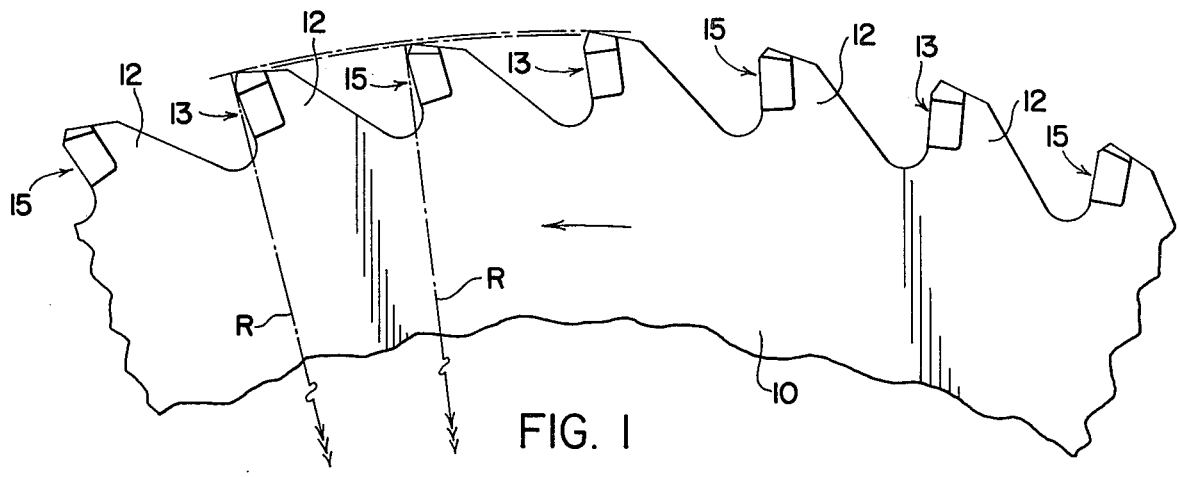
FIG. 1 is a side view of a part of the periphery of a circular saw showing the profile of the cutting teeth.
Figure 5:
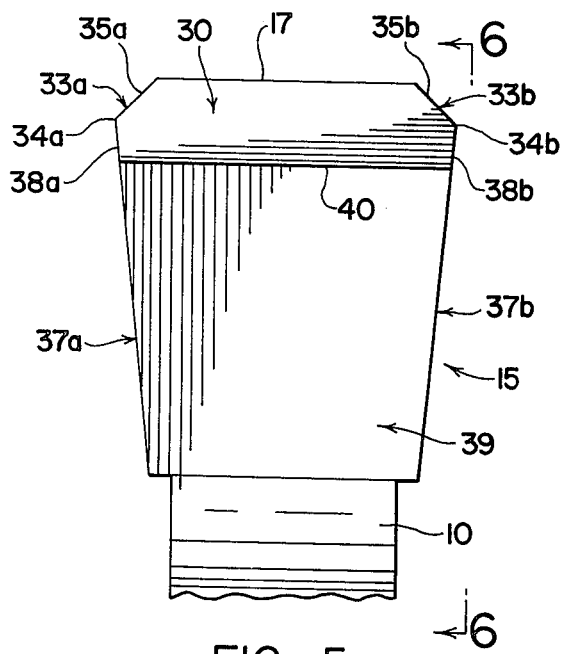
Figure 6:
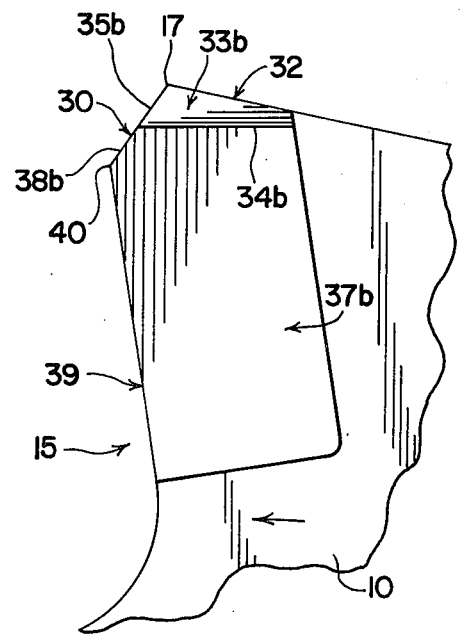

FIG. 5 is a frontal detail view of one of the low teeth 15 of the saw of FIG. 1; and FIG. 6 is a side view of such low tooth 15 from the aspect of line 6—6 in FIG. 5.

The saw shown in the drawings has a thin circular disc 10 of conventional saw blade steel with a series of peripheral teeth-supporting regions 12 in which are located high cutting teeth 13 alternately spaced between low cutting teeth 15. Cutting teeth 13 and 15 are of specially hard material such as tungsten carbide or similar hard materials and they are suitably brazed or otherwise fastened into the teeth-supporting regions 12 of the steel disc 10 in a manner well known in the art. Teeth 13 and 15 are spaced one from another around the entire periphery of disc 10, and, as hereafter more fully explained, are shaped to provide a so-called triple-chip cutting action.

Teeth 13 are described as high teeth because each has at its outermost extremity an outer cutting edge 16 which is located at a radially greater distance from the rotational axis of the saw than the location of the corresponding outer cutting edge 17 on each of the intervening low teeth 15. This radial difference is indicated in the arcuate chain dotted lines in FIG. 1. The diagram in FIG. 2 also shows this dimensional relationship. The outer cutting edges 16 and 17 extend transversely of their respective teeth and are parallel with the rotational axis of the saw.

Figure 3:
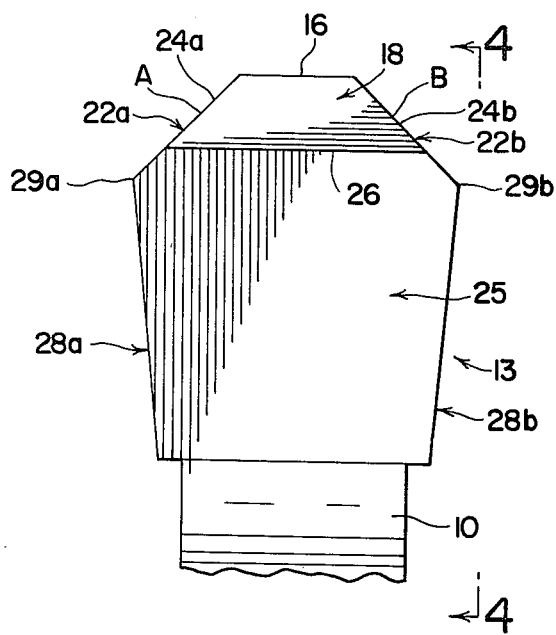
FIG. 3 is a frontal detail view of one of the high teeth 13 of the saw in FIG. 1.
Figure 4:
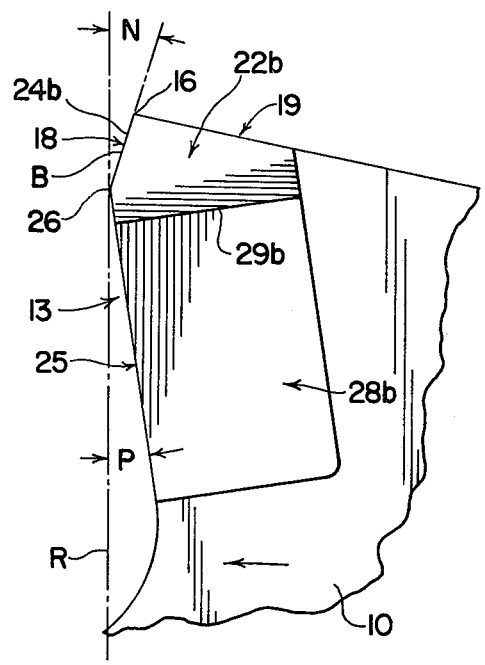
FIG. 4 is a side view of such high tooth 13 from the aspect of line 4—4 in FIG. 3.

Each high tooth 13 (see FIGS. 3 and 4) is of generally keystone shape in its frontal aspect. Its radially outermost portions are shaped to provide a negatively raked leading front face 18 which merges at the outer cutting edge 16 with a back or trailing plane face 19 (FIG. 4). Flanking faces 18 and 19 are two outer lateral plane faces 22a and 22b which slant toward each other from the lateral extremities of the tooth. Faces 22a and 22b, respectively, merge with front face 18 to provide two lateral slanting negatively-raked cutting edges 24a and 24b which slope toward and join with the outer cutting edge 16.

Additionally each tooth 13 has an inner positively raked front face 25 which merges with front face 18 along front edge 26 of the tooth. Similarly, each tooth 13 has two inner side faces 28a and 28b which merge with the outer lateral faces 22a and 22b, respectively, along side edges 29a and 29b.

Front face 18 (and lateral cutting edges 24a and 24b) is described as "negatively raked" in that it is ground to form an angle N in FIG. 4 with a radius R of the saw through edge 26. That is to say, angle N is generated in a clockwise direction relative to radius R and edge 26 so that when the saw is rotating (see arrow in FIG. 4) lateral cutting edges 24a and 24b lead outer cutting edge 16.

Angle N on the high tooth 13 may range from about 10° to about 18°. The inner front face 25 is ground to form an angle P in FIG. 4 with radius R which is generated in a counterclockwise direction about edge 26 and therefore is described as being "positively raked". Angle P may be positive or negative as desired.

Referring to FIGS. 5 and 6, each low tooth 15 is also of generally keystone shape in its frontal aspect. At its radially outer portions, each tooth 15 has a negatively raked leading front face 30 which merges at its outer cutting edge 17 with a back or trailing plane face 32. Two outer lateral plane faces 33a and 33b slant toward each other from lateral corners 34a and 34b and merge with front face 30 to provide two lateral slanting negatively-raked cutting edges 35a and 35b which slope toward and join with outer cutting edge 17.

Two lateral inner side faces 37a and 37b of tooth 15 slant toward each other toward the bottom of each tooth from lateral corners 34a and 34b. The portions of these side faces near corners 34a and 34b which join with front face 30 form with the latter additional short negatively-raked cutting edges 38a and 38b.

Figure 2:
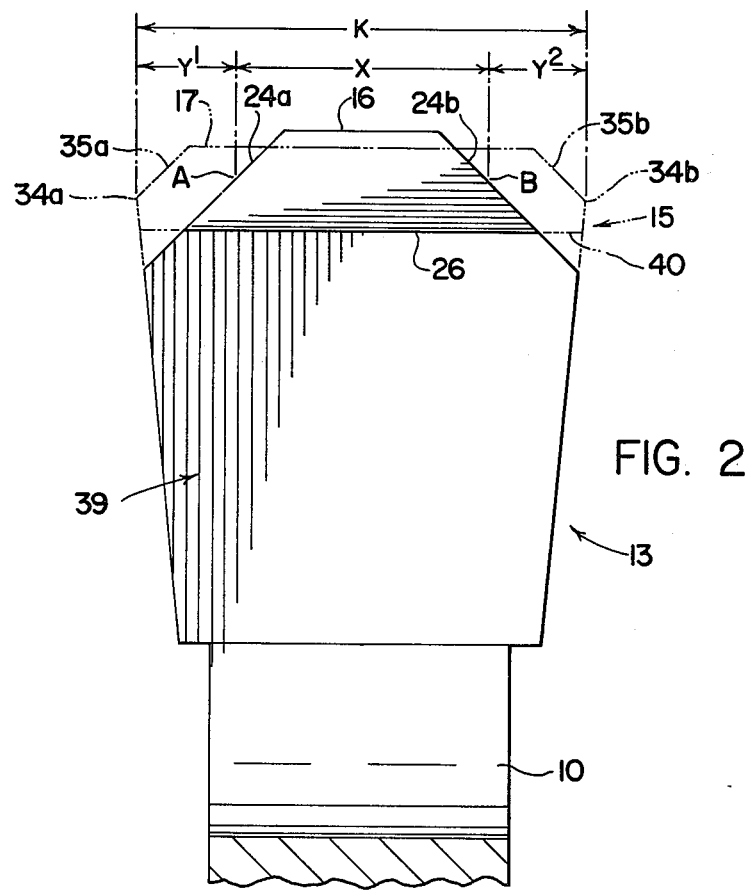
FIG. 2 is a diagram showing the frontal aspect of one of the high teeth 13 (in full lines) superimposed on one of the low teeth 15 (in dotted lines), together with certain dimensional relationships.

The inner front face 39 of each tooth 15 joins with outer face 30 along front corner 40 and is positively raked. The rake angles for the low teeth 15 are preferably in the same ranges as the corresponding angles described for teeth 13 and they are defined in the same way. The diagram in FIG. 2 best shows the relative proportions of teeth 13 and 15 to each other. Although the outer cutting edge 16 of tooth 13 extends radially beyond outer cutting edge 17 of tooth 15, the lateral width of tooth 15 between corners 34a and 34b, indicated by dimension K in FIG. 2, is greater than the maximum lateral width of tooth 13.

As the saw rotates against a work piece (not itself shown) each high tooth 13 initially comes into contact with the work piece approximately at two laterally separated points A and B on its outer slanting cutting edges 24a and 24b. Then, owing to the negatively raked orientation of edges 24a and 24b, a progressively increasing length of these edges engages the work. The effect is believed to be that two distinct "chips" spaced laterally by dimension X in FIG. 2 are initially cut from the work beginning about at points A and B. These chips are progressively lengthened as the additional portions of edges 24a and 24b come into engagement with the work. Finally, such chips are severed completely as the radially outer cutting edge 16 engages the work piece. Accordingly the negatively-raked cutting edges 24a and 24b provide a progressive shearing or chiseling action against the work piece, and the major proportion of the resulting heat generated by the cutting action seems to be absorbed primarily by the chips instead of the uncut adjoining body of the work piece. In any event each high tooth 13 removes from the center part of the kerf of the work piece a chip of material substantially equal in length to dimension X in FIG. 2. The length of such chip is ordinarily about 40–50% of the total width of the kerf.

The cutting action of each low tooth 15 is similar in principle except that the latter engages the work piece to form the lateral sides of the kerf. Owing to the negatively-raked position of cutting edges 33a and 33b, each low tooth 15 first engages a work piece at its lateral corners 38a and 38b to initiate a cutting or shearing effect on two laterally separated parts of the work (see dimension K in FIG. 2) at the sides of the kerf. The two distinct chips so formed are progressively lengthened by the cutting action of the remaining portions of cutting edges 33a and 33b and by the adjoining regions of outer cutting edge 17 until they are severed entirely at approximately points A and B in FIG. 2. Accordingly each low tooth 15 removes two laterally separated chips from the kerf, the length of which is indicated approximately by the dimensions $Y^1$ and $Y^2$ in FIG. 2. These constitute the remaining portions out from the kerf.

As is the case with tooth 13, each low tooth 15 starts its cutting action with a point contact with the work piece (viz. at corners 34a and 34b) and then cuts progressively into the work piece. The resulting heat generated by the cutting action seems to be primarily absorbed by the chips rather than the work piece itself, thereby providing a clean smooth cut surface along the work. This result is especially desirable for cutting all types of plastic materials in that it avoids melting the plastic, or tearing or chipping it along the sides of a kerf.

I claim:

1. A circular saw having a hard disc-like body with pairs of cutting teeth at its periphery, each pair of teeth consisting of one high tooth (13) and one low tooth (15), and characterized in that:
   a. both teeth of each pair have two laterally-separated negatively-raked cutting edges which slope toward each other from the sides of the tooth to a transverse radially outer cutting edge which is parallel to the rotational axis of the saw;
   b. the transverse radially outer cutting edge of each high tooth (13) being radially offset a greater distance from the rotational axis of the saw than the corresponding transverse edge of each low tooth 15; and
   c. the negatively-raked sloping cutting edges of each low tooth (15) being laterally separated a greater amount than the lateral separation between the negatively-raked sloping cutting edges of each high tooth (13).

* * * * *